United States Patent [19]
Eskijian

[11] 3,951,628
[45] Apr. 20, 1976

[54] PORTABLE FILTER BAG ASSEMBLY

[76] Inventor: Luther Eskijian, 2223 Midlothian Drive, Altadena, Calif. 91001

[22] Filed: Nov. 7, 1974

[21] Appl. No.: 521,551

Related U.S. Application Data

[63] Continuation of Ser. No. 427,835, Dec. 26, 1973, abandoned.

[52] U.S. Cl. .................................. 55/300; 55/305; 55/356; 55/366; 55/378; 55/462; 55/508
[51] Int. Cl.² .......................................... B01D 41/02
[58] Field of Search ............ 55/300, 341, 361, 366, 55/378, 508, 304, 305, 356, 462

[56] References Cited
UNITED STATES PATENTS

| | | | |
|---|---|---|---|
| 1,835,093 | 12/1931 | Ruemelin | 55/305 |
| 2,667,233 | 1/1954 | Vedder | 55/341 X |
| 2,805,731 | 9/1957 | Kron | 55/300 X |
| 3,041,808 | 7/1962 | Snyder | 55/341 X |
| 3,208,202 | 9/1965 | Herubel | 55/366 |
| 3,266,225 | 8/1966 | Barr | 55/341 X |
| 3,354,620 | 11/1967 | Scholl et al. | 55/341 X |
| 3,572,012 | 3/1971 | Martin et al. | 55/341 X |
| 3,653,190 | 4/1972 | Lee et al. | 55/366 X |
| 3,788,046 | 1/1974 | Kaeppler et al. | 55/341 |
| 3,864,106 | 2/1975 | Brandt | 55/341 X |

*Primary Examiner*—Frank W. Lutter
*Assistant Examiner*—William Cuchlinski, Jr.
*Attorney, Agent, or Firm*—William W. Haefliger

[57] ABSTRACT

A portable filter bag house assembly includes a collapsible main frame, a plenum chamber attached to the main frame, and a sub-frame carried by the main frame for shaking movement, the sub-frame supporting filter bags to extend toward the plenum chamber for communication therewith.

10 Claims, 8 Drawing Figures

FIG.I.
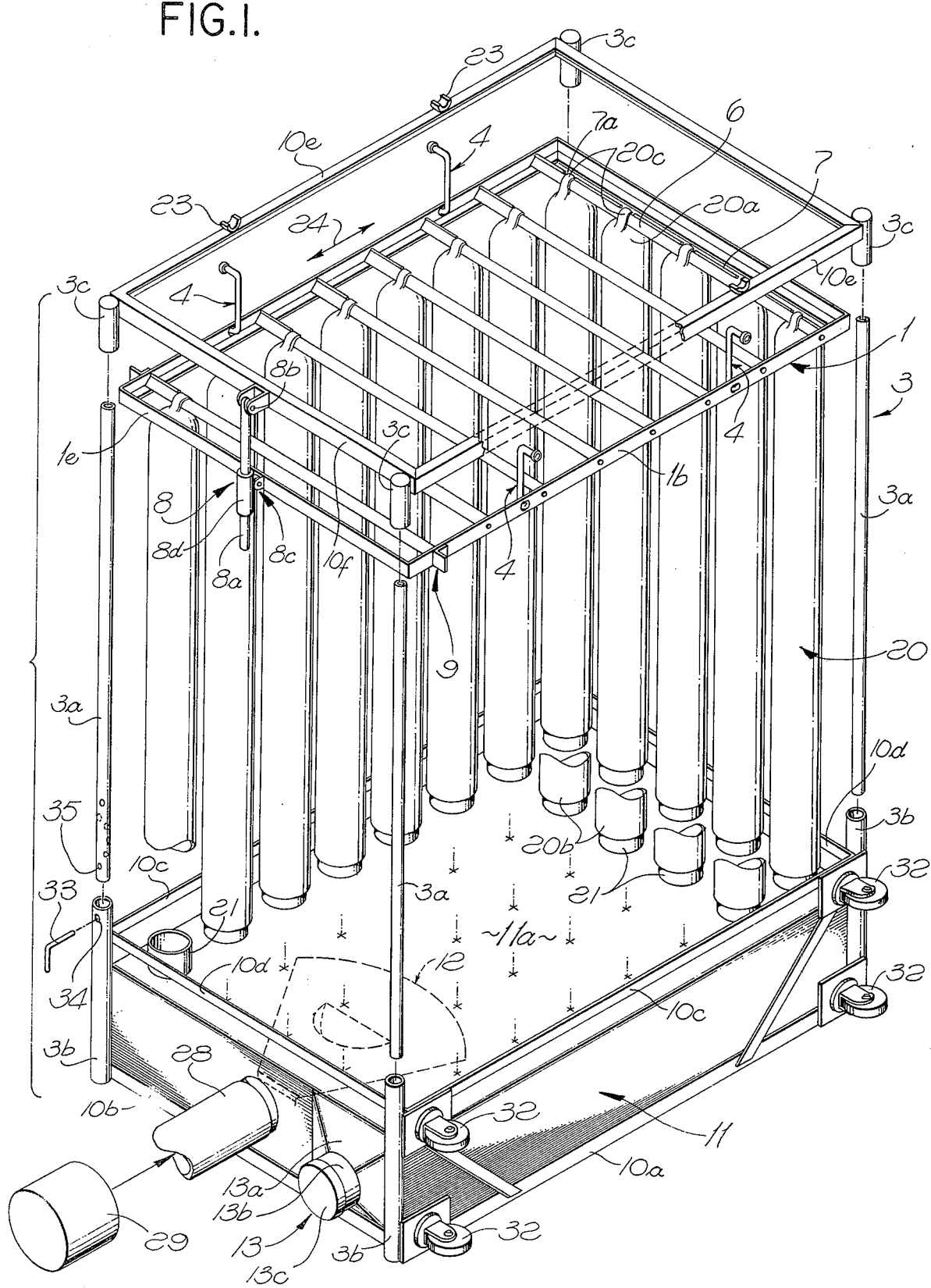

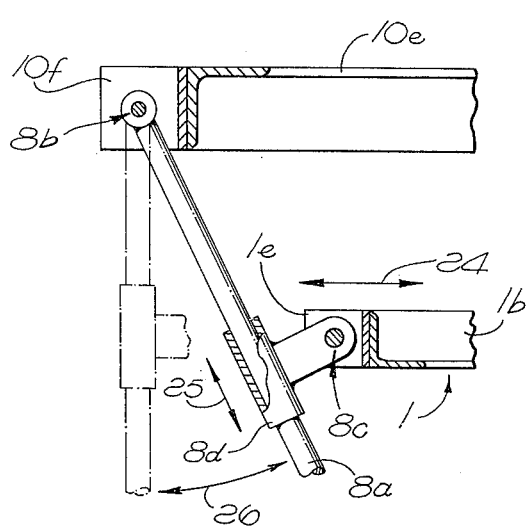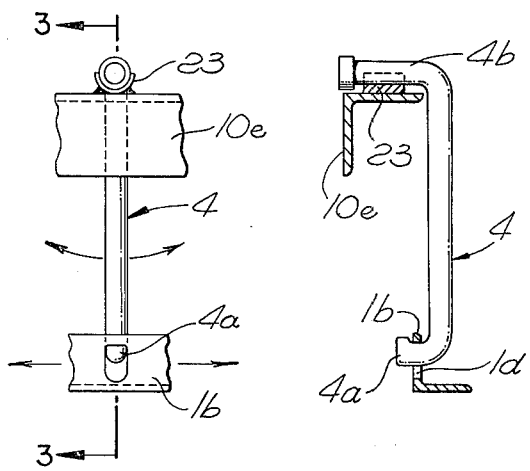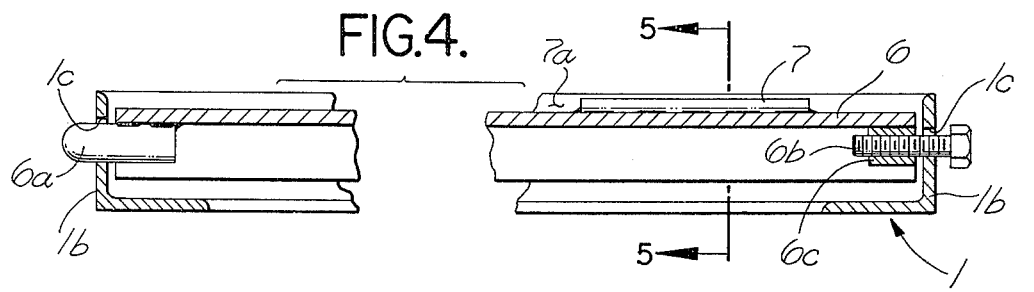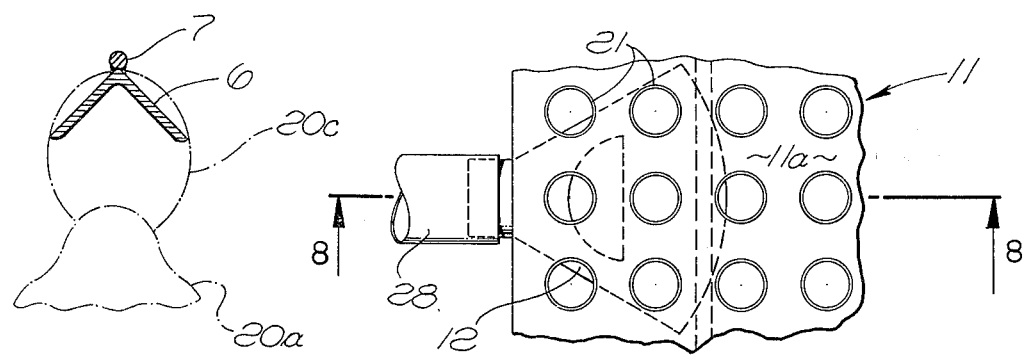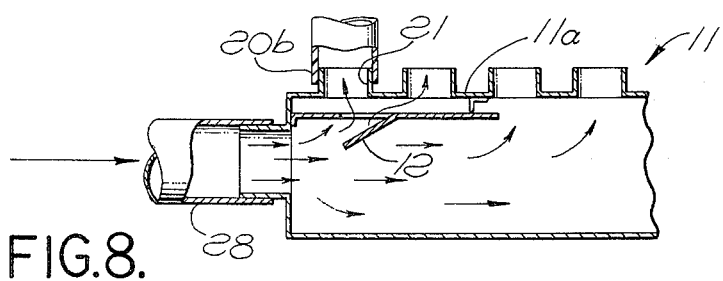

PORTABLE FILTER BAG ASSEMBLY

This is a continuation, of application Ser. No. 427,835, filed Dec. 26, 1973 now abandoned.

BACKGROUND OF THE INVENTION

This invention relates generally to the construction of bag houses, and more particularly concerns a novel portable bag house embodying many unusually advantageous features of construction, as will be seen.

There are many bag house designs for filtering dust and debris from entraining air or other gases; however, none incorporate the unusually advantageous features of construction, modes of operation and results as now enabled by the present invention.

SUMMARY OF THE INVENTION

It is a major object of the invention to provide an improved bag house of modular design and construction, and which is characterized by collapsibility and portability, facilitating movement between job sites. This is important to air pollution control, where for example sand blasting and other pollution emitting operations are carried out temporarily at many different locations.

Additional objects include the provision in such a collapsible and portable modular bag house assembly of a simple rocker system for shaking the bags, and including a rocker handle assembly and rocker arms or hangers; the provision for ease of cleaning the bags; mobility of the collapsed apparatus by truck and at job site by transport on attached wheels; use of removable uprights to suspend the rocker assembly above the plenum chamber, with removable pins interconnecting vertically interconnected members; filter bag suspension on cross bars which are detachable from the rocking sub-frame, to enable bag removal; provision for debris discharge from the plenum chamber; the use of a diverter in the plenum chamber to distribute the entering air flow; provision for tilting of the collapsed assembly onto wheels carried at one side of the plenum chamber; and provision for dismantling for repair and/or cleaning.

These and other objects and advantages of the invention, as well as the details of an illustrative embodiment, will be more fully understood from the following description and drawings, in which:

DRAWING DESCRIPTION

FIG. 1 is a perspective showing of one preferred form of the invention;

FIG. 2 is an enlarged elevational view of a sub-frame hanger;

FIG. 3 is a view of the FIG. 2 hanger taken at 90° relative to FIG. 2, as indicated by arrows 3—3;

FIG. 4 is an enlarged elevational showing of a bag support cross bar;

FIG. 5 is a view on lines 5—5 of FIG. 4;

FIG. 6 is an enlarged elevation showing the lever mechanism for moving or "shaking" the sub-frame;

FIG. 7 is a fragmentary plan view of the plenum chamber near its inlet; and

FIG. 8 is an elevation taken on lines 8—8 of FIG. 7.

DETAILED DESCRIPTION

The illustrated bag house comprises a main frame 3 including certain elongated upright members 3a which may have removable telescopic end interconnection with other upright frame members 3b at the corners of a sheet metal plenum chamber 11. Corner members 3b may be interconnected by bottom frame laterals 10a and 10b and straps 10c and 10d and to which the box-like plenum chamber may be connected. Upright members 3a also have removable telescopic end interconnection with additional frame corner members 3c spaced above member 3b and near a sub or rocker frame 1. As will be understood the described structure of the main frame is collapsible, as by removal of members 3a, to allow endwise collapse of a series of sub-frame supported filter bags 20 toward the plenum chamber.

The bags 20 are shown in the form of elongated, upright cylinders whose upper ends 20a are closed and attached to support means defined by the sub-frame 1. The lower ends 20b of the bags are attached to the plenum chamber, as for example as seen in FIG. 8 where tubular bosses 21 integral with the top panel 11a of the plenum chamber receive the bag lower ends. Loops 20c integral with the bag upper ends are removably received over supporting cross bars 6, as for example angle irons. Spacers 7 on the tops of the latter define laterally spaced zones 7a between the spacers to receive the bag loops 20c, as is clear from FIGS. 1, 3 and 5, whereby the bags have predetermined locations in rows and directly above the bosses 21. Further, the bag may easily be removed off the cross bars, for cleaning or replacement, after detachment of the cross bars from the sub-frame supports 1b. Note that the latter contain through openings 1c to pass end extensions 6a on the cross bars as well as fasteners 6b threadably received in nuts 6c at the opposite ends of the cross bars. Accordingly, removal of the fasteners permits release of the cross bars and removal of the bag loops.

Hangers 4 are provided to support or suspend the sub-frame from the main frame for rocking movement, and above the plenum chamber. As shown in the drawings, four such hangers may be provided to have lower lateral ends 4a removably received through openings 1d in the sub-frame supports 1b. The hangers upper ends 4b extend laterally for removable reception in upwardly opening bearings or seats 23 carried by main-frame members 10e interconnecting corner members 3c. Accordingly, the sub-frame may be rocked back in forth in the lateral directions indicated by arrows 24 in FIGS. 1 and 6, in order to facilitate cleaning of collected debris off the insides of the bags, to drop into the plenum chamber. Further, a shaker system 8 is provided, and includes an upright lever 8a pivotally connected at 8b with the main frame strut 10f, and also connected with the sub-frame at a location 8c to actuate its rocking movement. Note that the connection 8c is facilitated by a tubular sleeve 8d pivotally attached to the sub-frame strut 1c and slidably receiving the lever 8a, enabling relative sliding of the lever in the sleeve in the directions of arrows 25 in FIG. 6, the lever pivotal motion indicated by arrows 26. In addition, there are striker shoulders on the main frame (as for example on a corner member 3a) and on the sub-frame, as at 9, and adapted to interengage and jar the sub-frame and bags in response to sub-frame rocking movement. Such impact or jarring efficiently jars loose debris from the bag interiors.

It will be observed that the plenum chamber has an inlet 28 at one end thereof to receive air and entrained dust and debris, as from a source 29. The latter may include a pressure reduction chamber to collect large particles so that only fines are carried to the bag house. FIG. 8 shows an adjustable damper or diffuser 12 located within the chamber to deflect some of the entering air and particles upwardly toward the entrance ends of certain bags. Accordingly, the supply of air to all bags is kept more nearly uniform. The plenum chamber also has an outlet for debris removal, located at 13 in FIG. 1. A funnel shaped element 13a attached to the end wall of the chamber terminates in stub pipe 13b, which is removably capped at 13c. *A screw conveyor may be located within the chamber to advance debris toward the outlet.*

The assembly at one side of the chamber 11 carries caster wheels 32 to support the assembly after collapse of the sub-frame 1 toward the chamber 11 followed by tilting of the assembly one quarter turn to bring the wheels under the chamber. This facilitates wheeled transport of the portable bag house from site to site.

Finally, FIG. 1 shows that pins 33 are receivable through openings 34 in corner members 3b, and through holes 35 in upright 3a to facilitate releasable connection and disconnection of these elements, as well as lengthwise tensioning of the bags. Alternatively, the uprights may be supported by springs or scissors linkages.

I claim:

1. In a portable filter baghouse, the assembly comprising
   a. a main frame,
   b. a plenum chamber attached to the frame,
   c. a sub-frame carried by the main frame for shaking movement relative thereto, the sub-frame having means to support a plurality of filter bags to extend longitudinally toward the plenum chamber for communication therewith, and
   d. the main frame including collapsible means supporting the sub-frame for bodily swinging displacement relative to the main frame and also for longitudinal collapse with the bags toward the plenum chamber,
   e. the sub-frame being spaced directly above the plenum chamber, there being wheels carried by the assembly at one side of the plenum chamber for supporting the assembly after collapse of the sub-frame toward the plenum chamber and tilting of the assembly to bring the wheels under the plenum chamber.

2. The assembly of claim 1 including the bags in the form of elongated upright fabric cylinders the upper ends of which are closed and attached to the support means and the lower ends of which are attached to the plenum chamber so that the bag interiors communicate with the plenum chamber interior.

3. The assembly of claim 1 wherein said collapsible means includes releasably interconnected, longitudinally extending frame members.

4. The assembly of claim 1 wherein said means includes hangers suspending the sub-frame from the main frame for rocking movement relative thereto, the hangers and sub-frame including removably interfitting and relatively rotatable bearing elements which are vertically separable.

5. The assembly of claim 1 wherein said bag support means comprises cross bars removably carried by the sub-frame, and spacers on said bars to removably locate bag loops at predetermined locations along said elements.

6. The assembly of claim 1 wherein the plenum chamber has an air inlet, there being a damper located in said chamber in the path of air entering the chamber via said air inlet to deflect some entering air and entrained particles toward entrances defined by certain bags.

7. The assembly of claim 1 wherein the plenum chamber has a collected debris outlet defined by a funnel shaped element at one side of the chamber.

8. In a portable filter baghouse, the assembly comprising
   a. a main frame,
   b. a plenum chamber attached to the main frame,
   c. a sub-frame carried by the main frame for shaking movement relative thereto, the sub-frame having means to support a plurality of filter bags to extend longitudinally toward the plenum chamber for communication therewith, and
   d. the main frame including collapsible means supporting the sub-frame for longitudinal collapse with the bags toward the plenum chamber, said collapsible means including releasably interconnected, longitudinally extending frame members, said members including certain elongated members which have removable telescopic end interconnection with other frame members near the plenum chamber and removable telescopic end interconnection with additional frame members near the sub-frame.

9. In a portable filter baghouse, the assembly comprising
   a. a main frame,
   b. a plenum chamber attached to the main frame,
   c. a sub-frame carried by the main frame for shaking movement relative thereto, the sub-frame having means to support a plurality of filter bags to extend longitudinally toward the plenum chamber for communication therewith,
   d. the main frame including collapsible means supporting the sub-frame for longitudinal collapse with the bags toward the plenum chamber,
   e. hangers suspending the sub-frame from the main frame for rocking movement relative thereto, and
   f. a lever pivotally connected with the main frame and also connected with the sub-frame at a location to actuate said rocking movement thereof, there being striker shoulders on the main frame and sub-frame adapted to interengage and jar the sub-frame in response to said rocking movement.

10. In a portable filter baghouse, the assembly comprising
    a. a main frame,
    b. a plenum chamber attached to the frame,
    c. a sub-frame carried by the main frame for shaking movement relative thereto, the sub-frame having means to support a plurality of filter bags to extend longitudinally toward the plenum chamber for communication therewith, and
    d. the main frame including collapsible means supporting the sub-frame for bodily swinging displacement relative to the main frame and also for longitudinal collapse with the bags toward the plenum chamber thereby to reduce the overall volume of the assembly,
    e. there being wheel means for supporting the assembly after collapse of the sub-frame toward the plenum chamber and on which the assembly may then be transported said wheel means carried by the assembly in offset relation to the plenum chamber to support the assembly after tilting thereof.

* * * * *